(12) United States Patent
Casaburo et al.

(10) Patent No.: US 11,636,656 B1
(45) Date of Patent: *Apr. 25, 2023

(54) DEPTH RATE UP-CONVERSION

(71) Applicant: Apple Inc., Cupertino, CA (US)

(72) Inventors: Daniele Casaburo, Cupertino, CA (US); Adrian P. Lindberg, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/491,901

(22) Filed: Oct. 1, 2021

Related U.S. Application Data

(63) Continuation of application No. 17/089,927, filed on Nov. 5, 2020, now Pat. No. 11,151,798.

(60) Provisional application No. 62/934,685, filed on Nov. 13, 2019.

(51) Int. Cl.
*G06T 19/00* (2011.01)
*G06T 7/564* (2017.01)

(52) U.S. Cl.
CPC .......... *G06T 19/006* (2013.01); *G06T 7/564* (2017.01); *G06T 2207/10016* (2013.01); *G06T 2207/10028* (2013.01)

(58) Field of Classification Search
CPC .............. G06T 19/006; G06T 7/564; G06T 2207/10016; G06T 2207/10028
See application file for complete search history.

(56) References Cited

U.S. PATENT DOCUMENTS

| | | |
|---|---|---|
| 8,073,247 B1 | 12/2011 | Sandrew et al. |
| 11,151,798 B1 * | 10/2021 | Casaburo ............ G06T 7/246 |
| 2018/0143976 A1 | 5/2018 | Huston |
| 2019/0037150 A1 | 1/2019 | Srikanth et al. |

OTHER PUBLICATIONS

Yuan, Ming-Ze; Gao, Lin; Fu, Hongbo and Xia, Shihong; "Temporal Upsampling of Depth Maps Using a Hybrid Camera"; IEEE Transactions on Visualization and Computer Graphics, arXiv: 1708:03760v2 [cs:GR] Nov. 5, 2018, pp. 1-13.

* cited by examiner

*Primary Examiner* — Jeffery A Brier
(74) *Attorney, Agent, or Firm* — Thompson Hine LLP

(57) ABSTRACT

Various implementations disclosed herein include devices, systems, and methods that create additional depth frames where a depth camera runs at a lower frame rate than a light intensity camera. Rather than upconverting the depth frames by simply repeating a previous depth camera frame, additional depth frames are created by adjusting some of the depth values of a prior frame based on the RGB camera data (e.g., by "dragging" depths from their positions in the prior depth frame to new positions for a new frame). Specifically, a contour image is generated, and changes in the contour image are used to determine how to adjust (e.g., drag) the depth values for the additional depth frames. The contour image may be based on a mask (e.g., occlusions masks identifying where the hand occludes the virtual cube).

20 Claims, 12 Drawing Sheets

DEPTH RATE UP-CONVERSION

CROSS-REFERENCE TO RELATED APPLICATIONS

This Application is a Continuation of U.S. patent application Ser. No. 17/089,927 filed Nov. 5, 2020, which claims the benefit of U.S. Provisional Application Ser. No. 62/934,685 filed Nov. 13, 2019, each of which is incorporated by reference herein in its entirety.

TECHNICAL FIELD

The present disclosure generally relates to providing electronic content such as computer-generated reality (CGR) environments, and in particular, to systems, methods, and devices for providing such electronic content based on images and depth information detected in a physical environment.

BACKGROUND

Electronic content may be provided based on images of a physical environment and depth information detected in the physical environment. For example, images of a physical environment may be captured and displayed with virtual content added to it, e.g., with the virtual content overlaying portions of the images. The virtual content may be added to the images based on the depths of physical objects that are depicted in the images of the physical environment. For example, a virtual cube may be displayed on top of a portion of an image of a physical environment such that a first portion of the virtual cube appears in front of a mountain of the physical environment and such that a second portion of the virtual cube is not visible because that portion is behind a person's hand of the physical environment. In this example, the first portion of the virtual cube occludes the mountain and the second portion of the virtual cube is occluded by the hand. Determining how to display portions of the virtual cube with respect to any given image may be based on depths determined for objects of the physical environment that are depicted in that image and depths intended for the virtual content.

Existing techniques for providing electronic content based on images of a physical environment and depth information detected in the physical environment may be inaccurate and inefficient. For example, depth information captured by a depth camera may be captured at a different rate than light intensity images captured by an RGB camera. An image captured at a given point in time may not have depth information available for that point of time and thus may be automatically associated with inaccurate/unsynchronized depth information from a prior point in time. Accordingly, the difference in capture rates may result in undesirable or unintended appearances, for example, resulting in occlusions that are inaccurately displayed and other noticeable issues.

SUMMARY

Various implementations disclosed herein include devices, systems, and methods that provide electronic content based on images of a physical environment, depth information detected in the physical environment, and additional depth information that is created. The additional depth information may be created in the circumstance where a depth camera runs at a slower frame rate than a light intensity (e.g., RGB) camera. Rather than upconverting the depth frames by simply repeating a previous depth camera frame, additional depth frames are created by adjusting some of the depth values of a prior frame based on the light intensity camera data (e.g., by "dragging" depths from their positions in the prior depth frame to new positions for a new frame). Specifically, a contour image (e.g., identifying interior and/or exterior outlines of a hand with respect to a virtual cube that the hand occludes) is generated based on a mask (e.g., occlusion masks identifying where the hand occludes the virtual cube). Changes in the contour image are used to determine how to adjust (e.g., drag) the depth values for the additional depth frames.

Some implementations involve a method of creating additional depth images corresponding to depths of a physical environment based on the adjusting of the contour image. The method involves receiving a first sequence of images corresponding to light intensities of a physical environment (e.g., RGB camera frames) and a second sequence of images corresponding to depths of the physical environment (e.g., depth camera frames). The first sequence has a first rate and the second sequence has a second rate that differs from (e.g., is slower than) the first rate. Pixels of images of the first sequence are spatially correlated and aligned with pixels of images of the second sequence. For example, an RGB camera image may have a pixel with a light intensity value and correspond to a point on the tip of a hand in the physical environment and a depth camera image may have a pixel with a depth value that corresponds to that same point on the tip of the hand. Associations between light intensity camera pixels and depth camera pixels may be determined based on known spatial relationships between the light intensity and depth cameras.

The exemplary method further involves generating a contour image for a first frame of the first sequence of images. The contour image may identify an interior edge or exterior edge of the portion of the physical environment or the portion of the virtual content. A contour image may be generated by identifying an inside outline inside the area of the virtual content that is occluded by the area of the physical environment in the occlusion mask and/or by identifying an outside outline outside the area of the virtual content that is occluded by the area of the physical environment in the occlusion mask.

The exemplary method further involves adjusting the contour image based on a second frame of the first sequence of images. Adjusting the contour image is also known as evolving, altering, or modifying the contour image. Adjustments to the contour image may be processed for the first sequence of images until a new mask is obtained or received, such as when a new mask is received. The adjustment is based on information (e.g., a model) computed form the real scene RGB camera (e.g., mono/multi-dimensional color/texture models, histograms, gaussian mixture of models, and the like). In some implementations, the model can be computed also with data from other sensors (e.g., a depth sensor) where this data is pixel-aligned with the data from the real scene RGB camera. The mask data may be used to generate two regions: inner and outer and, for each region, a model may be computed. The two models may be used to determine how to evolve/alter/modify the contour image.

The exemplary method further involves determining additional depth images corresponding to depths of the physical environment based on the adjusting of the contour image. The adjustment of the contour image may be used to identify depth values for additional depth images. For example, the evolution of the contour image may occur in multiple iterations until termination criteria is met (e.g., maximum number of iterations, the whole allotted time-slot has been used, some mathematical condition is met, etc.). In one example, for each iteration, some pixels (e.g., the feature displayed at a particular pixel location) of the inner/outer contour will move in some direction to a different pixel location, each pixel can move in any direction and by only one neighboring pixel location, and when a pixel moves locations, it drags the associated depth value with the moving pixel to the subsequent pixel location. The additional depth images may be inserted into the second sequence to effectively up-convert the second rate of the second sequence to correspond to the first rate of the first sequence.

The exemplary method may further involve receiving mask data that distinguishes a portion (e.g., some or all) of the physical environment from a portion (e.g., some or all) of the virtual content and generating the contour image based on the mask data. The mask data may include a mask such as an occlusion mask, a foreground mask, a background mask, a mid-focus-range mask, or the like. Occlusion masks may be determined based on the RGB data in the first sequence of images and RGB data in a third sequence of images corresponding to virtual content, and thus does not require the known or missing depth data of the second sequence. Additionally, or alternatively, occlusion masks may be determined, for example, from color segmentation (e.g., the hands color), using real depth thresholding, using people detection, and/or using real depth data in the second sequence of images and virtual depth data in a fourth sequence of images corresponding to virtual content.

Alternatively, a second contour image is generated, and determining additional depth images corresponding to depths of the physical environment is based on the second contour image. For example, the contour image of the current frame may be compared with the contour image of the prior frame to estimate a movement of a feature from one pixel to a neighbor pixel on the perimeter of the hand and the depth data may be adjusted accordingly. In another example, a second contour image subsequently follows a first contour image in a sequence of image frames and a movement of a feature of the physical environment from a first pixel in the first contour image to an associated second pixel in the second contour image is identified. The additional depth images may be generated based on the identified movement of the feature.

In some implementations, the method further includes adjusting the second sequence of images based at least on the additional depth images, for example, by adding the additional depth images to the second sequence of images. The additional depth images may be inserted into the second sequence to effectively up-convert the second rate of the second sequence to be synchronized with the first rate of the first sequence. In other words, sufficient depth images may be created such that there is a depth image corresponding to every image of the first sequence (e.g., every RGB image will have a corresponding depth image).

In some implementations, the method further includes determining occlusion between the physical environment and the virtual content based on the adjusted second sequence of images (e.g., of the physical environment depths) and a fourth sequence of images (e.g., of the virtual content depths). The method of determining the occlusion may include comparing depths of the physical environment in the adjusted second sequence of images with depths of the virtual content in the fourth sequence of images.

In some implementations, electronic content is provided based on light and depth information about a physical environment and light and depth information about virtual content. Thus, in addition to a first sequence of images corresponding to light intensities of a physical environment (e.g., RGB camera frames) and a second sequence of images corresponding to depths of the physical environment (e.g., depth camera frames), some implementations receive a third sequence of images corresponding to light intensities of the virtual content (e.g., RGB frames for the virtual content) and a fourth sequence of images corresponding to depths of the virtual content. The virtual content information may be used in determining the mask data that is used by the method. For example, the mask data may include an occlusion mask that identifies an area of the virtual content depicted in an image of the third sequence of images (e.g., an RGB image of virtual content) that is occluded by an area of the physical environment depicted in a corresponding image of the first sequence of images (e.g., an RGB image of the physical environment).

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
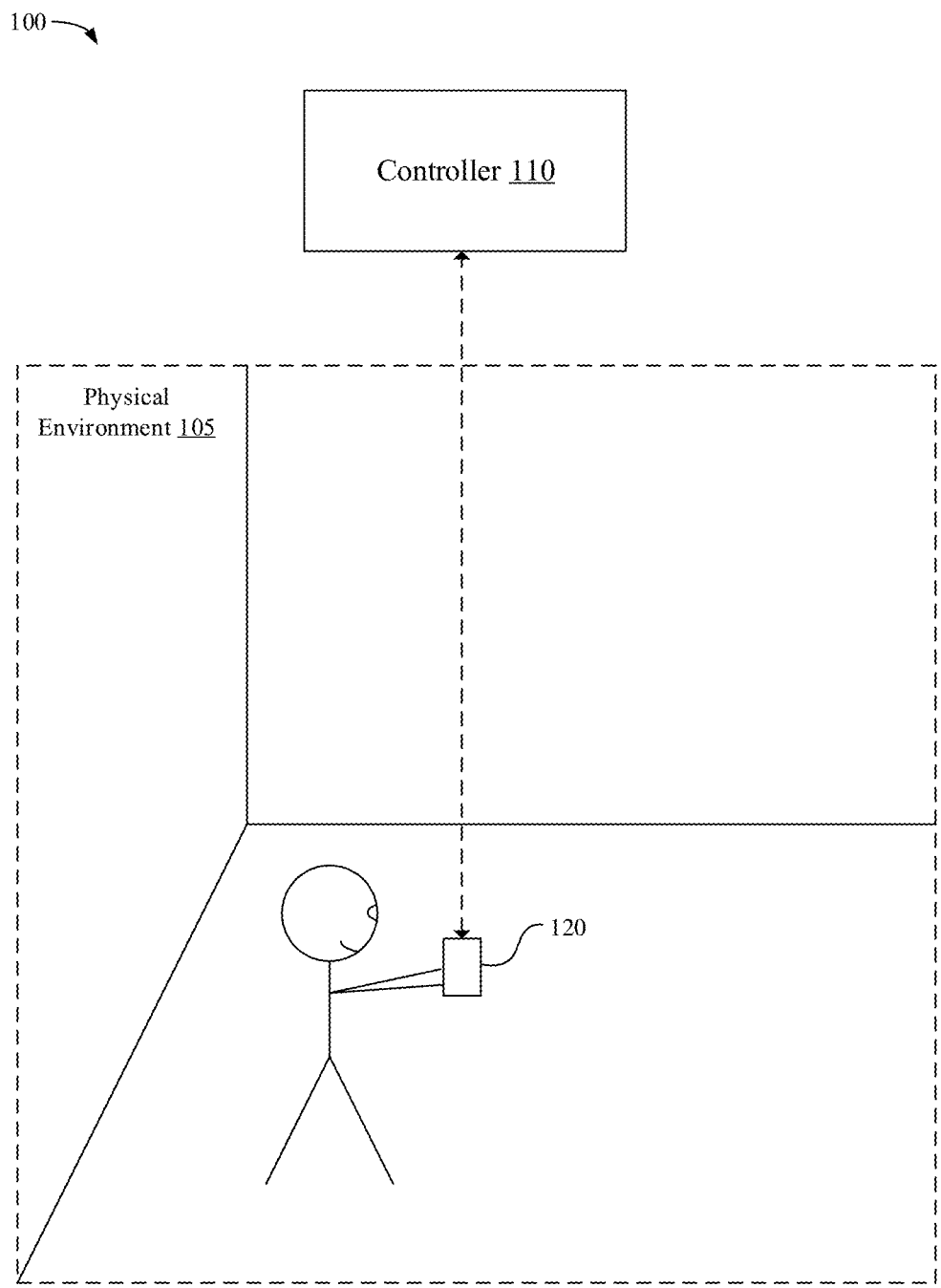
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and a device 120.

In some implementations, the controller 110 is configured to manage and coordinate an experience for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. In one example, the controller 110 is a local server located within the physical environment 105. In another example, the controller 110 is a remote server located outside of the physical environment 105 (e.g., a cloud server, central server, etc.). In some implementations, the controller 110 is communicatively coupled with the device 120 via one or more wired or wireless communication channels 144 (e.g., BLUETOOTH, IEEE 802.11x, IEEE 802.16x, IEEE 802.3x, etc.).

In some implementations, the device 120 is configured to present an environment to the user. In some implementations, the device 120 includes a suitable combination of software, firmware, and/or hardware. The device 120 is described in greater detail below with respect to FIG. 3. In some implementations, the functionalities of the controller 110 are provided by and/or combined with the device 120.

According to some implementations, the device 120 presents a computer-generated reality (CGR) environment to the user while the user is in the physical environment 105. A CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. In some implementations, the image data is pixel-registered with the images of the physical environment 105 (e.g., RGB, depth, and the like) that is utilized with the imaging process techniques within the CGR environment described herein.

Examples of CGR include virtual reality and mixed reality. A virtual reality (VR) environment refers to a simulated environment that is designed to be based entirely on computer-generated sensory inputs for one or more senses. A VR environment comprises virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In some implementations, the user wears the device 120 on his/her head. As such, the device 120 may include one or more displays provided to display content. For example, the device 120 may enclose the field-of-view of the user. In some implementations, the device 120 is a handheld electronic device (e.g., a smartphone or a tablet) configured to present content to the user. In some implementations, the device 120 is replaced with a chamber, enclosure, or room configured to present content in which the user does not wear or hold the device 120.

Figure 2:
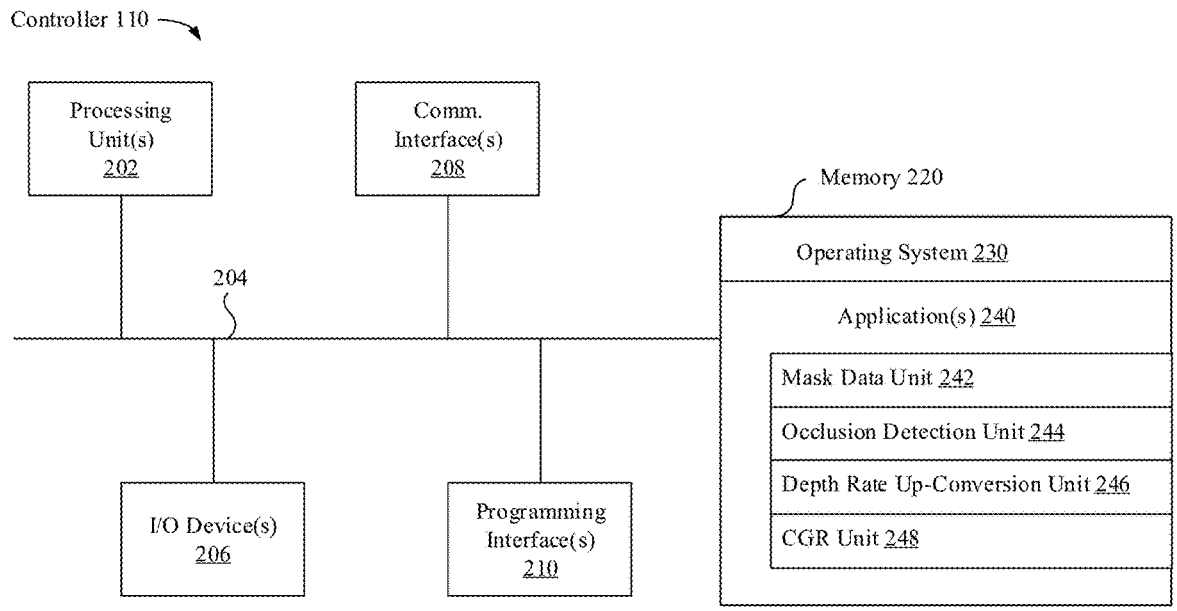
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and one or more applications 240.

The operating system 230 includes procedures for handling various basic system services and for performing hardware dependent tasks. In some implementations, the operating system 230 includes built in CGR functionality, for example, including a CGR environment application or viewer that is configured to be called from the one or more applications 240 to display a CGR environment within a user interface. In some implementations, the applications 240 are configured to manage and coordinate one or more experiences for one or more users (e.g., a single experience for one or more users, or multiple experiences for respective groups of one or more users).

The applications 240 include a mask data unit 242, an occlusion detection unit 244, a depth rate conversion unit 246, and a CGR unit 248. The mask data unit 242, the occlusion detection unit 244, the depth rate conversion unit 246, and the CGR unit 248 can be combined into a single application or unit or separated into one or more additional applications or units. The mask data unit 242 is configured with instructions executable by a processor to obtain the image data and generate mask data (e.g., an occlusion mask) using one or more of the techniques disclosed herein. The occlusion detection unit 244 is configured with instructions executable by a processor to perform occlusion handling for a CGR environment using one or more of the techniques disclosed herein. The depth rate conversion unit 246 is configured with instructions executable by a processor to perform depth rate up-conversion handling (e.g., by "dragging" depths from their positions in the prior depth frame to new positions for a new frame) for a CGR environment using one or more of the techniques disclosed herein. The CGR unit 248 is configured with instructions executable by a processor to provide a CGR environment that includes depictions of a physical environment including real objects and virtual objects. The virtual objects may be positioned based on the detection, tracking, and representing of objects in 3D space relative to one another based on stored 3D models of the real objects and the virtual objects, for example, using one or more of the techniques disclosed herein.

Moreover, FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
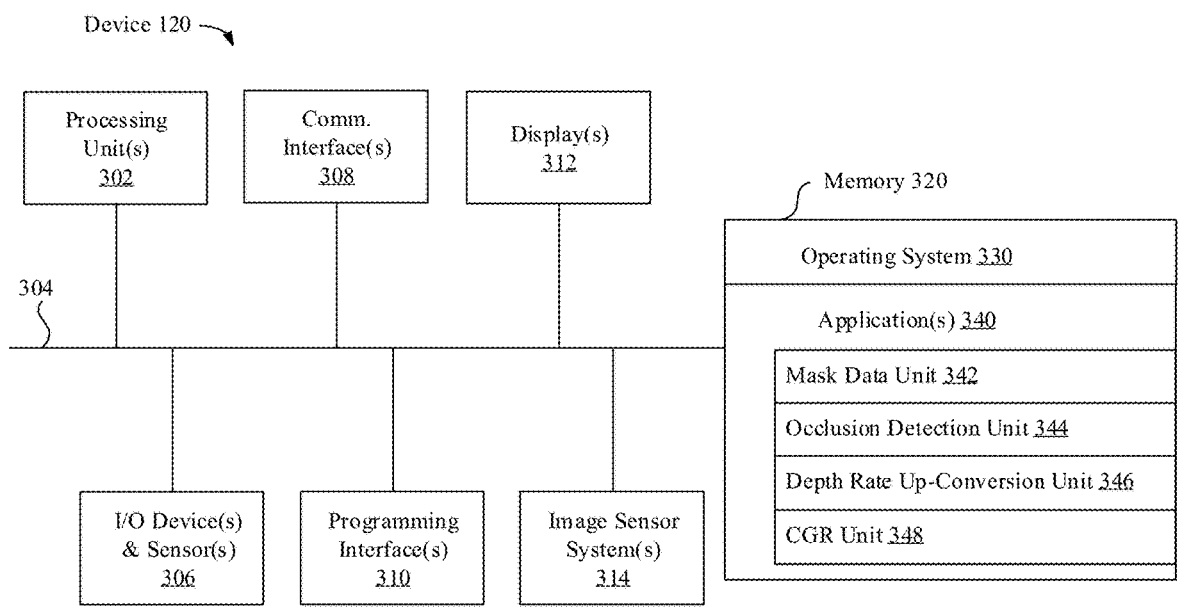
FIG. 3 is a block diagram of an example device in accordance with some implementations.

FIG. 3 is a block diagram of an example of the device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, 120, and/or the like type interface), one or more programming (e.g., I/O) interfaces 310, one or more AR/VR displays 312, one or more interior and/or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 312 are configured to present the experience to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the device 120 includes a single display. In another example, the device 120 includes a display for each eye of the user.

In some implementations, the one or more image sensor systems 314 are configured to obtain image data that corresponds to at least a portion of the physical environment 105. For example, the one or more image sensor systems 314 include one or more RGB cameras (e.g., with a complimentary metal-oxide-semiconductor (CMOS) image sensor or a charge-coupled device (CCD) image sensor), monochrome cameras, IR cameras, event-based cameras, and/or the like. In various implementations, the one or more image sensor systems 314 further include illumination sources that emit light, such as a flash. In various implementations, the one or more image sensor systems 314 further include an on-camera image signal processor (ISP) configured to execute a plurality of processing operations on the image data including at least a portion of the processes and techniques described herein.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and one or more applications 340.

The operating system 330 includes procedures for handling various basic system services and for performing hardware dependent tasks. In some implementations, the operating system 330 includes built in CGR functionality, for example, including an CGR environment application or viewer that is configured to be called from the one or more applications 340 to display a CGR environment within a user interface. In some implementations, the applications 340 are configured to manage and coordinate one or more experiences for one or more users (e.g., a single experience for one or more users, or multiple experiences for respective groups of one or more users).

The applications 340 include a mask data unit 342, an occlusion detection unit 344, a depth rate conversion unit 346, and a CGR unit 348. The mask data unit 342, the occlusion detection unit 344, the depth rate conversion unit 346, and the CGR unit 348 can be combined into a single application or unit or separated into one or more additional applications or units. The mask data unit 342 is configured with instructions executable by a processor to obtain the image data and generate mask data (e.g., an occlusion mask) using one or more of the techniques disclosed herein. The occlusion detection unit 344 is configured with instructions executable by a processor to perform occlusion handling for a CGR environment using one or more of the techniques disclosed herein. The depth rate conversion unit 346 is configured with instructions executable by a processor to perform depth rate up-conversion handling (e.g., by "dragging" depths from their positions in the prior depth frame to new positions for a new frame) for a CGR environment using one or more of the techniques disclosed herein. The CGR unit 348 is configured with instructions executable by a processor to provide a CGR environment that includes depictions of a physical environment including real objects and virtual objects. The virtual objects may be positioned based on the detection, tracking, and representing of objects in 3D space relative to one another based on stored 3D models of the real objects and the virtual objects, for example, using one or more of the techniques disclosed herein.

Although these elements are shown as residing on a single device (e.g., the device 120), it should be understood that in other implementations, any combination of the elements may be located in separate computing devices. Moreover, FIG. 3 is intended more as functional description of the various features which are present in a particular implementation as opposed to a structural schematic of the implementations described herein. As recognized by those of ordinary skill in the art, items shown separately could be combined and some items could be separated. For example, some functional modules (e.g., applications 340) shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Device 120 of FIG. 3 may be implemented as a head-mounted device (HMD) or other device that will present a view of the CGR environment. For example, a HMD may include internal sensors or be used with external sensors that track the HMDs current position and orientation in a 3D coordinate system over time. The tracking may involve computer vision, visual inertial odometry (VIO), simultaneous localization and mapping (SLAM), or any other appropriate technique. In some implementations, the viewpoint is associated with the actual pose of a real device. In some implementations, the viewpoint is associated with a virtual pose of a virtual camera.

Depth Rate Up-Conversion Techniques

Figure 4:
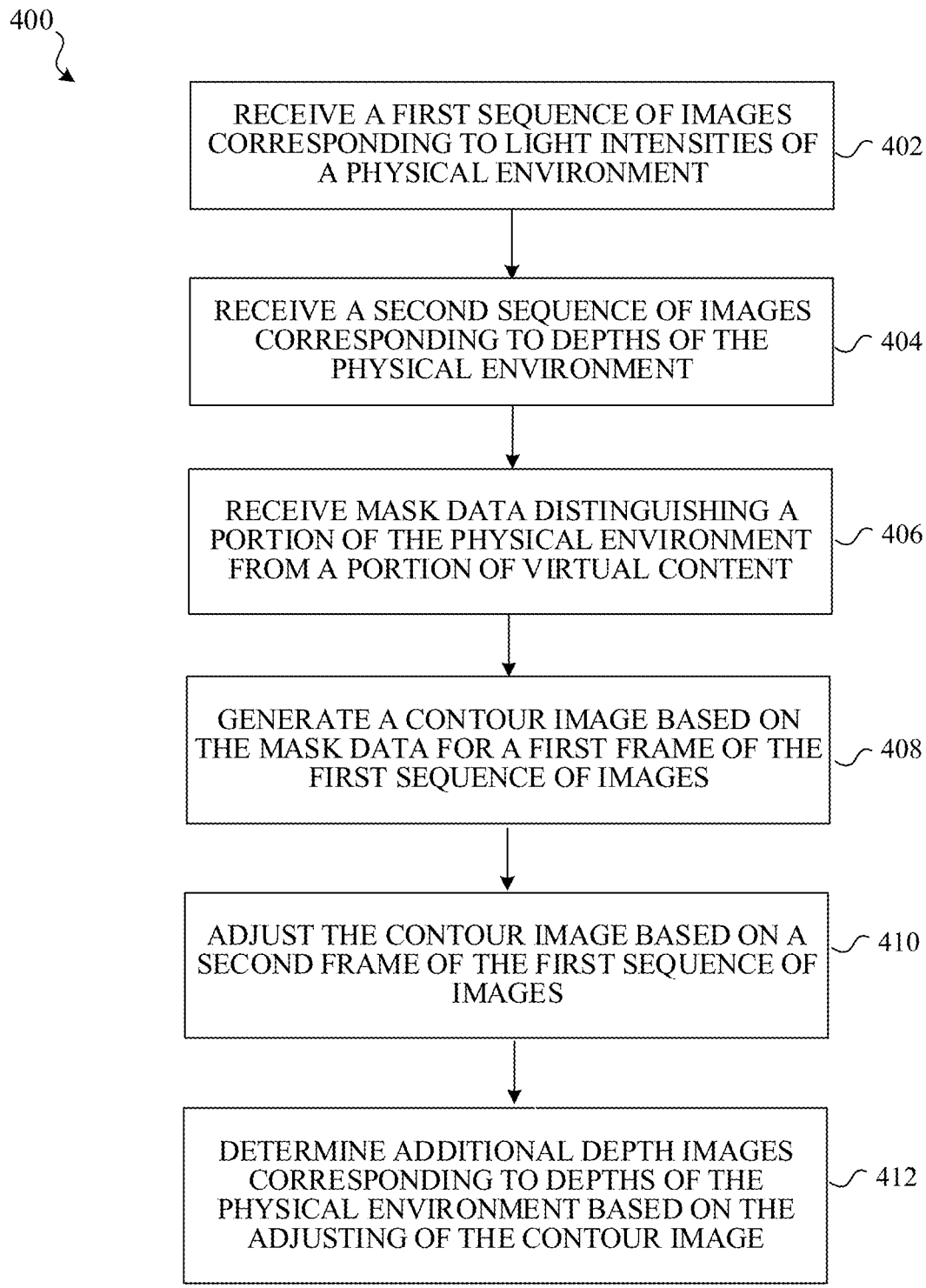
FIG. 4 is a flowchart representation of an exemplary method that determines additional depth images corresponding to depths of the physical environment based on the adjusting of the contour image in accordance with some implementations.

FIG. 4 is a flowchart representation of an exemplary method 400 that determines additional depth images corresponding to depths of a physical environment based on the adjusting of a contour image. In some implementations, the method 400 is performed by a device (e.g., controller 110 of FIGS. 1 and 2), such as a mobile device, desktop, laptop, or server device. The method 400 can be performed on a device (e.g., device 120 of FIGS. 1 and 3) that has a screen for displaying 2D images and/or a screen for viewing stereoscopic images such as a head-mounted display (HMD). In some implementations, the method 400 is performed by processing logic, including hardware, firmware, software, or a combination thereof. In some implementations, the method 400 is performed by a processor executing code stored in a non-transitory computer-readable medium (e.g., a memory).

At block 402, the method 400 receives a first sequence of images corresponding to light intensities of a physical environment. For example, the first sequence of images corresponding to light intensities may be acquired from one or more RGB cameras (e.g., with a complimentary metal-oxide-semiconductor (CMOS) image sensor or a charge-coupled device (CCD) image sensor), monochrome cameras, IR cameras, event-based cameras, or the like. According to some implementations, images of the first sequence of images corresponding to light intensities of the physical environment are acquired at a particular light intensity-based frame rate or a range of frame rates. For example, an RGB camera may acquire light intensity frames of a physical environment at a 120 frames per second (FPS).

At block 404, the method 400 receives a second sequence of images corresponding to depths of the physical environment. A depth image is an image channel in which each pixel relates to a distance between the image plane and the corresponding object in a light intensity (e.g., RGB) image. For example, the second sequence of images corresponding to depths may be acquired from one or more depth cameras (e.g., cameras that acquire depth based on structured light (SL), passive stereo (PS), active stereo (AS), time of flight (ToF), and the like). Depth cameras can provide per-pixel depth information aligned with image pixels from a standard camera. According to some implementations, the second sequence of images corresponding to depths of the physical environment are acquired at a depth-based frame rate or a range of frame rates that is slower than the light intensity frame rate. For example, a depth camera may acquire depth frames of a physical environment at 30 FPS compared to the 120 FPS for a light intensity camera with which it is paired.

Various techniques may be applied to acquire depth image data to assign each portion (e.g., pixel) of the image. Such techniques may involve obtaining and analyzing depth values, depth images, and depth histograms and may result in the creation of one or more masks that identify portions of the image associated with the different focal depth planes. In some implementations, depth data is obtained from sensors or 3D models of the content of an image. Some or all of the content of an image can be based on a real environment, for example, depicting the scene of the physical environment 105 around the device 120. Image sensors may capture images of the scene 105 for inclusion in the image and depth information about the scene of the physical environment 105 may be determined. In some implementations, a depth sensor on the device 120 determines depth values for pixels of images captured by an image sensor on the device 120. The scene of the physical environment 105 around the user may be 3D modeled based on one or more values and subsequent depths of objects depicted in subsequent images of the scene can be determined based on the model and camera position information. Virtual objects in a CGR environment may have pre-assigned depth values or coordinates from which such depth values can be determined. In some implementations, depth data (e.g., associated with content of a scene or model) is directly analyzed to separate the image portions (e.g., pixels) into foreground and background. For example, a predetermined threshold or thresholds may be used to make such separations.

At block 406, the method 400 receives mask data distinguishing a portion (e.g., some or all) of the physical environment from a portion (e.g., some or all) of virtual content. Creating a mask may include techniques that involve obtaining and analyzing depth information and may result in the creation of one or more masks that identify portions of the image associated with the different focal depth planes. In some implementations, the mask is an occlusion mask that identifies an area of occlusion between two objects (e.g., an occlusion between a physical object and a virtual object as shown in FIG. 6). For example, the occlusion masks may be determined based on the depth data in the second sequence of images and depth data in a fourth sequence of images corresponding to the depth of the virtual content. In some implementations, the frequency at which the mask data is obtained is lower than the one of the first sequence of images (e.g., real scene RGB camera), but is synchronized with the second sequence of images (e.g., real depth camera), where the second sequence of images has a lower FPS than the first sequence of images.

In some implementations, the occlusion masks maybe determined based on the depth information coming from a virtual scene and the physical environment 105 that are aligned with the first sequence of images corresponding to light-intensity (e.g., RGB) image data. Additionally, the occlusion masks may be determined, for example, from color segmentation (e.g., the hand's color), using real depth thresholding, using people detection, or using real depth data in the second sequence of images and virtual depth data in a fourth sequence of images corresponding to virtual content. Additionally, or alternatively, one or more thresholds are used to create one or more different masks. For example, a depth threshold of 2 m can be used to generate a foreground mask or a background mask.

Figure 7:
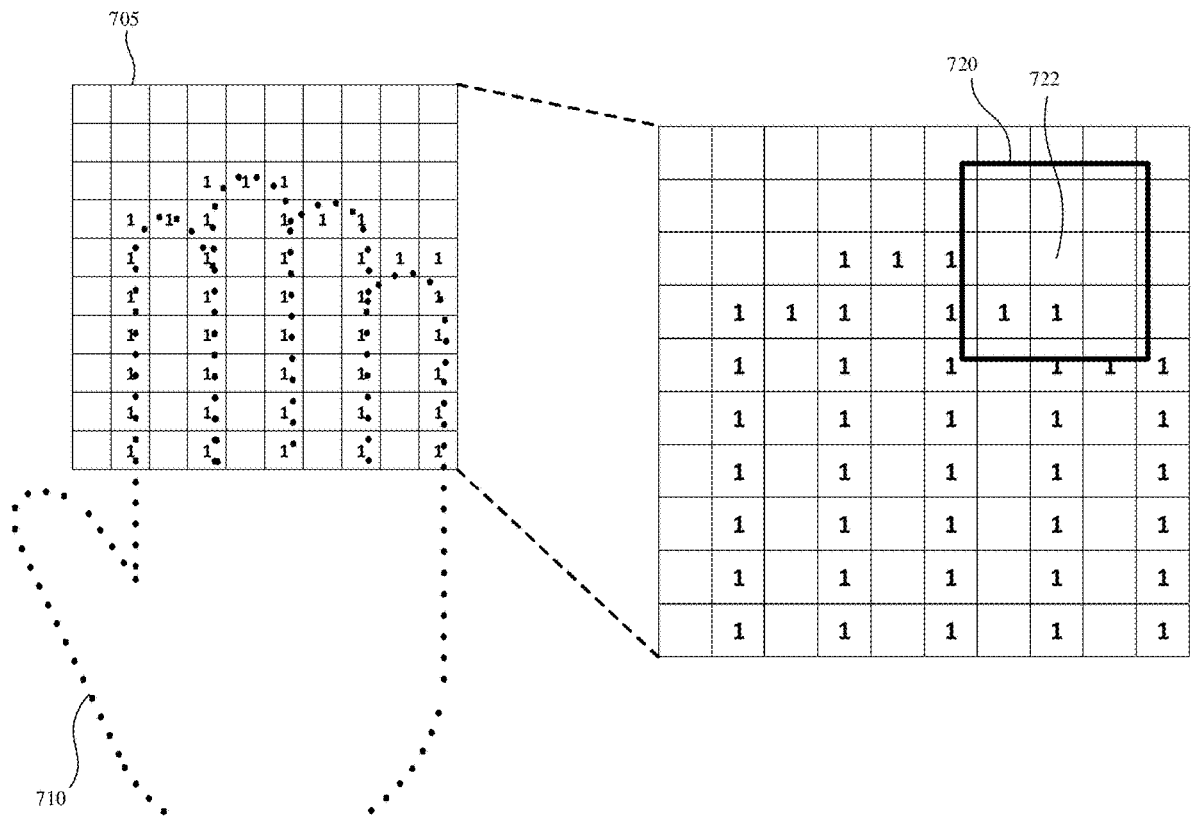
FIG. 7 is a block diagram illustrating an example occlusion contour image at an occlusion boundary region in accordance with some implementations.

At block 408, the method 400 generates a contour image based on the mask data for a first frame of the first sequence of images. Contours are lines or curves joining continuous points (along the boundary), having similar color or intensity. Generating a contour image may utilize techniques used for shape analysis and object detection and recognition. According to some implementations, the contour image, based on the mask data, identifies an interior edge and/or an exterior edge of the portion of the physical environment or the portion of the virtual content. For an occlusion mask, the contour image may identify an interior edge and/or an exterior edge of the portion of the physical environment that occludes the portion of the virtual content. For example, as shown in FIGS. 7 and 9, a contour image identifies the edges of a physical object in the physical environment. Additionally, or alternatively, the contour image identifies the interior and/or exterior edges of a virtual object in a CGR environment.

At block 410, the method 400 adjusts the contour image based on a second frame of the first sequence of images. Adjusting the contour image is also known as evolving, altering, or modifying the contour image. Adjustments to the contour image may be processed for the first sequence of images until a new mask is obtained or received, such as when a new mask is received. The adjustment is based on information (e.g., a model) computed form the real scene RGB camera (e.g., mono/multi-dimensional color/texture models, histograms, gaussian mixture of models, and the like). In some implementations, the model can be computed also with data from other sensors (e.g., a depth sensor) where this data is pixel-aligned with the data from the real scene RGB camera. The mask data may be used to generate two regions: inner and outer and, for each region, a model may be computed. The two models may be used to determine how to evolve/alter/modify the contour image.

At block 412, the method determines additional depth images corresponding to depths of the physical environment based on the adjusting of the contour image. The adjustment of the contour image may be used to identify depth values for additional depth images. For example, the evolution of the contour image may occur in multiple iterations until termination criteria is met (e.g., maximum number of iterations, the whole allotted time-slot has been used, some mathematical condition is met, etc.). In one example, for each iteration, some pixels (e.g., the feature displayed at a particular pixel location) of the inner/outer contour will move in some direction to a different pixel location, each pixel can move in any direction and by only one neighboring pixel location, and when a pixel moves locations, it drags the associated depth value with the moving pixel to the subsequent pixel location. The additional depth images may be inserted into the second sequence to effectively up-convert the second rate of the second sequence to correspond to the first rate of the first sequence.

The additional depth images may be inserted into the second sequence to effectively up-convert the second rate of the second sequence to correspond to the first rate of the first sequence. The upconverted second rate (e.g., depth image frame rate) is synchronized with the first rate (e.g., light intensity frame rate). For example, as previously discussed, the depth camera frame rate may be 30 FPS, and the light intensity frame rate may be 120 FPS. In other words, for every depth camera frame, there are four light intensity frames generated. Thus, the method 400 can determine three additional depth images per cycle and increase the effective depth camera frame rate to 120 FPS and synchronize the frame rates accordingly with the light intensity frame rate.

Alternatively, a second contour image is generated, and determining additional depth images corresponding to depths of the physical environment based on the second contour image. For example, the contour image of a current frame may be compared with the contour image of a prior frame to estimate a movement of a feature from one pixel to a neighbor pixel on the perimeter of the hand and the depth data may be adjusted accordingly. In another example, a second contour image subsequently follows a first contour image in a sequence of image frames and a movement of a feature of the physical environment from a first pixel in the first contour image to an associated second pixel in the second contour image is identified. The additional depth images may be generated based on the identified movement of the feature.

Figure 13:
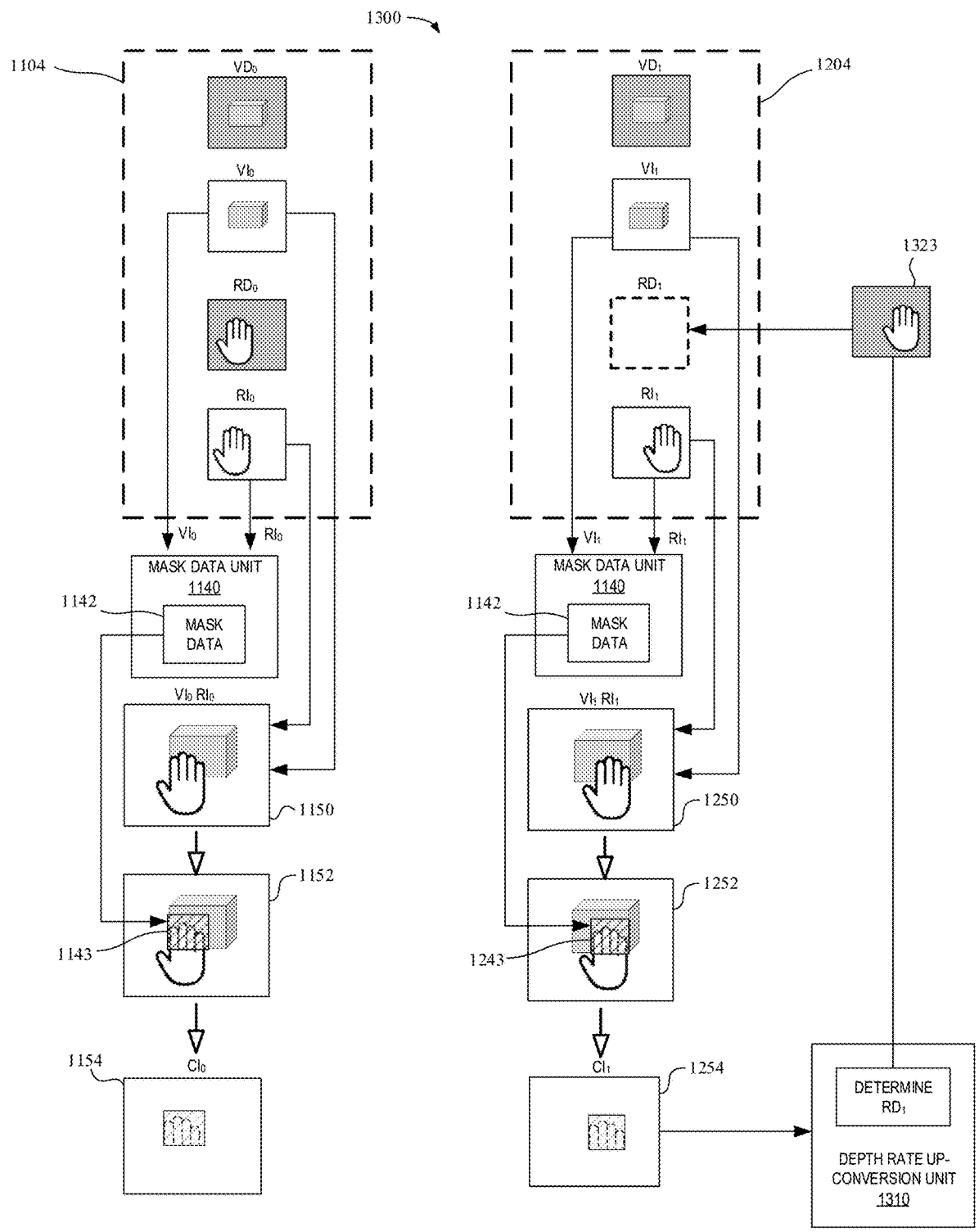
FIG. 13 is a system flow diagram of an example determination of additional depth images based on the adjusting of a contour image according to certain implementations.
Figure 14:
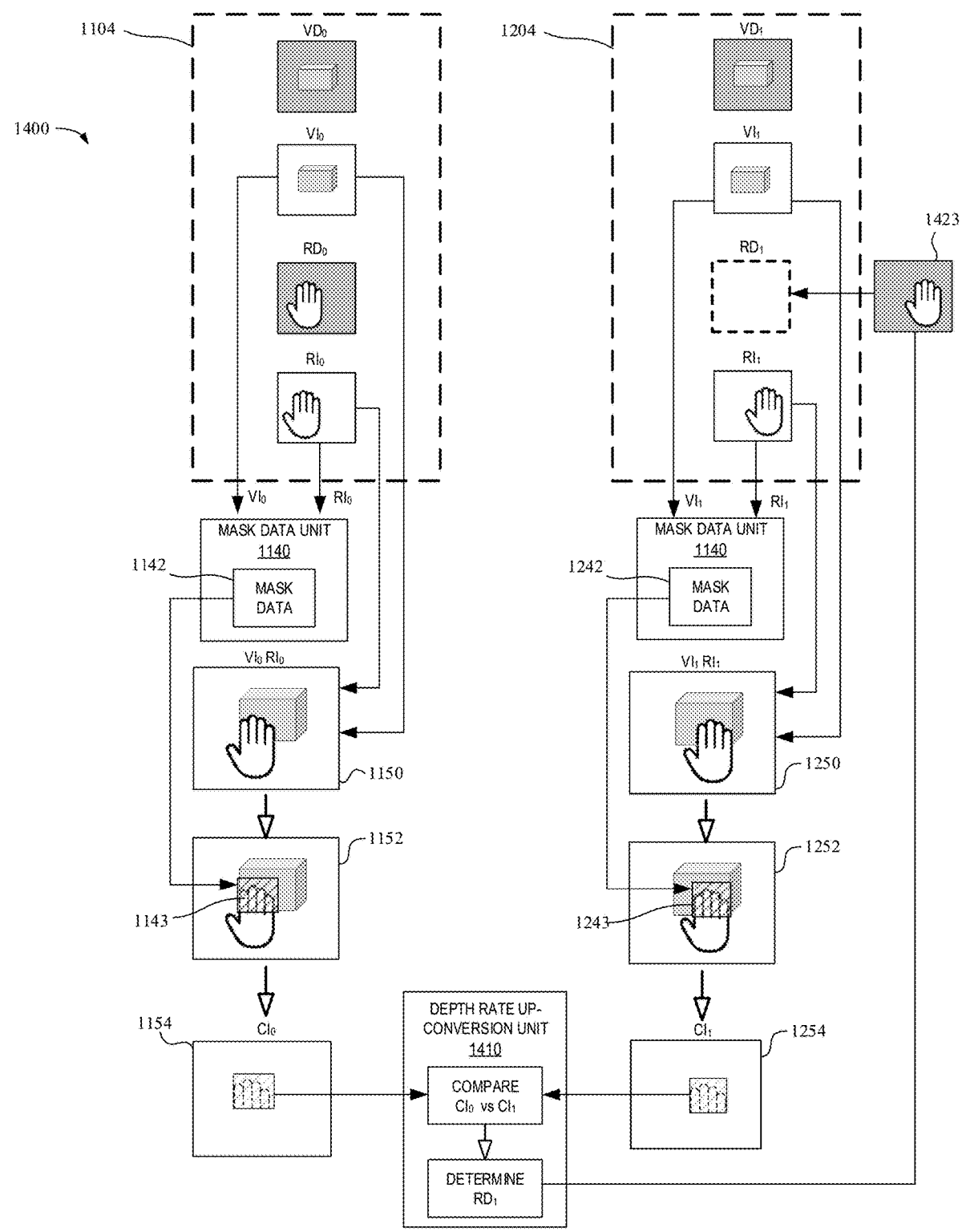
FIG. 14 is a system flow diagram of an example determination of additional depth images based on generated contour images according to certain implementations.

In one implementation, as further described below for method 500, to determine additional depth images, a contour image of a current frame (e.g., at time $t_1$) can be compared with a contour image of a prior frame (e.g., at time $t_0$) to estimate a movement of a feature from one pixel to a neighbor pixel on the perimeter of an object, and adjust (e.g., drag) the depth data accordingly. In the exemplary embodiment, as shown in FIG. 13, the contour image for a current frame (e.g., at time $t_1$) is an adjusted contour image of the prior frame (e.g., at time $t_0$). Alternatively, as shown in FIG. 14, the contour image for a current frame (e.g., at time $t_1$) is a second generated contour image, and the contour image of the prior frame (e.g., at time $t_0$) is a first generated contour image.

Figure 5:
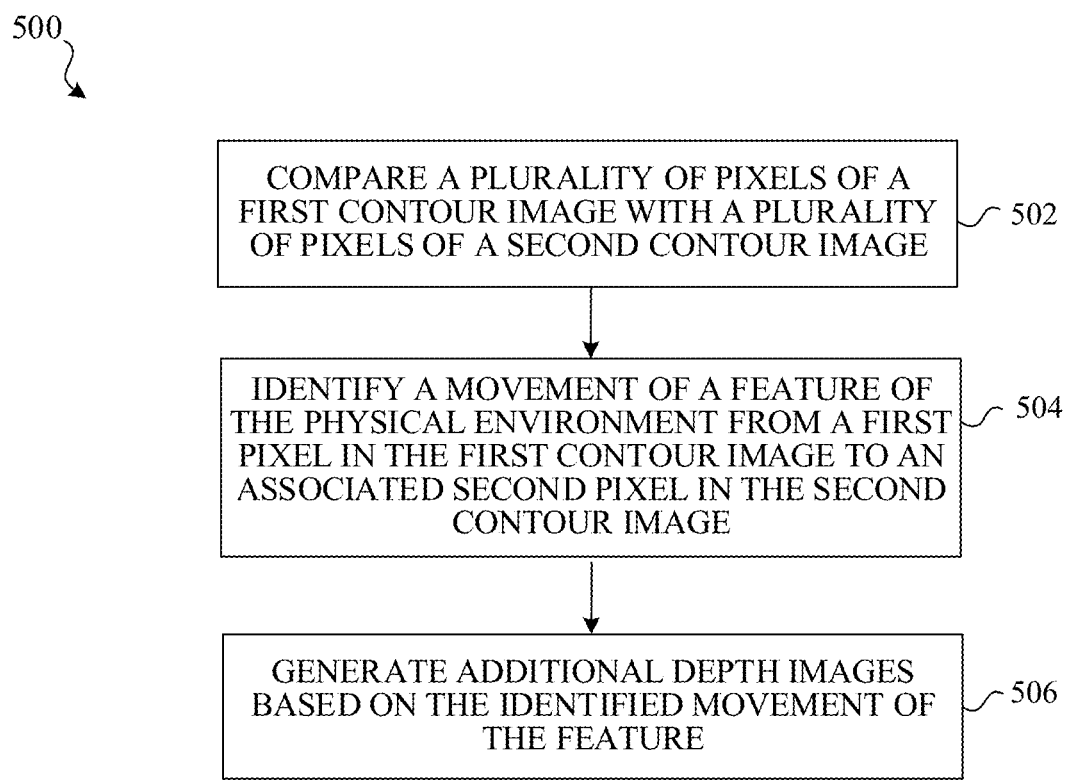
FIG. 5 is a flowchart representation of an exemplary method of generating additional depth images in accordance with some implementations.

FIG. 5 is a flowchart representation of an exemplary method 500 that determines additional depth images corresponding to depths of the physical environment. In some implementations, the method 500 is performed by a device (e.g., controller 110 of FIGS. 1 and 2), such as a mobile device, desktop, laptop, or server device. The method 500 can be performed on a device (e.g., device 120 of FIGS. 1 and 3) that has a screen for displaying 2D images and/or a screen for viewing stereoscopic images such as a head-mounted display (HMD). In some implementations, the method 500 is performed by processing logic, including hardware, firmware, software, or a combination thereof. In some implementations, the method 500 is performed by a processor executing code stored in a non-transitory computer-readable medium (e.g., a memory).

In the exemplary embodiment, as shown in FIG. 13, the contour image for the first frame of the first sequence of images (e.g., at time $t_0$) is referred to, with respect to method 500, as a first contour image, and adjusting the contour image based on the second frame of the first sequence of images (e.g., at time $t_1$) is referred to, with respect to method 500, as a second contour image (e.g., an adjusted contour image). Alternatively, shown in FIG. 14, the contour image for a current frame (e.g., at time $t_1$) is a second contour image, and the contour image of the prior frame (e.g., at time $t_0$) is a first contour image.

Figure 10A:
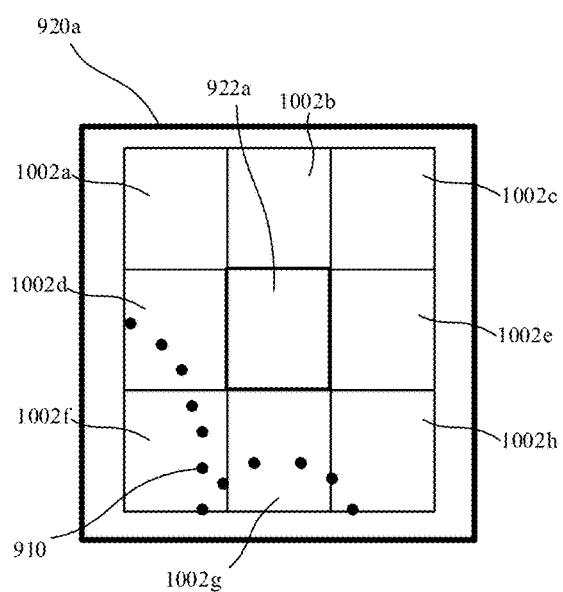
FIG. 10A-10B are block diagrams illustrating a closer view of the example contour image of FIGS. 9A-9B according to certain implementations.
Figure 10B:
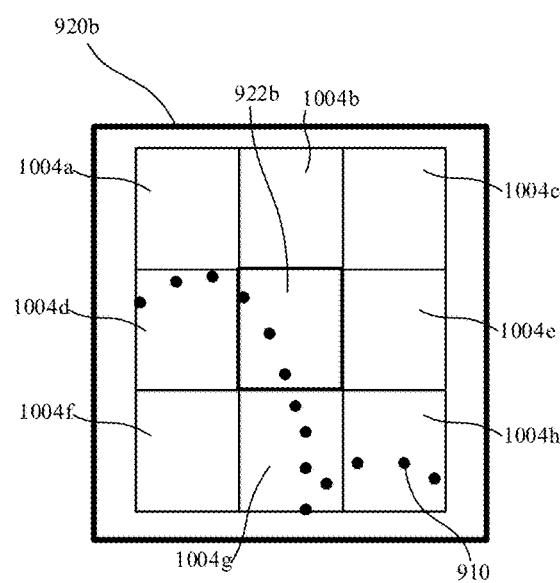

At block 502, the method 500 compares a plurality of pixels of a first contour image with a plurality of pixels of a second contour image. The plurality of pixels of the first contour image are spatially correlated and are aligned with the plurality of pixels of the second contour image. For example, pixel locations on a display are aligned and correlated between each subsequent image frame, where each individual pixel location that the contour image is displayed upon in a first image at an initial frame (e.g., at time $t_0$) is compared to the corresponding pixels that the adjusted contour image is displayed in a subsequent frame (e.g., at time $t_1$), as shown in FIGS. 10A-10B, further described herein.

A "feature" of a contour image for each pixel may be represented at a binary level for each pixel on the display, or for each pixel within a particular area that the system receives a mask for (e.g., the occlusion boundary region 630 as shown in FIG. 6). For example, as shown in FIG. 7, if the contour image displayed on the occlusion grid 705, can be represented by a "1" at each pixel that the edge of the contour is displayed, and a "0" or nothing for each pixel that the contour image does not overlap or is displayed.

At block 504, the method 500 identifies a movement of a feature of the physical environment from a first pixel in the first contour image to an associated second pixel in the second contour image. For example, FIG. 10A illustrates the generated contour image 910 such that the pixel 922a does not include a feature of the contour image, but neighboring pixels 1002d, 1002f, 1002g, and 1002h would be marked as having a feature and may be marked by the system with "1" for positively including the feature of the contour image 910, and in a subsequent image frame, FIG. 10B illustrates the generated contour image 910 has moved to the right, such that the pixel 922b (corresponding to the pixel 922a having the same pixel location) and neighboring pixels 1004d, 1004g, and 1004h would be marked as having a feature and may be marked by the system with "1" for positively including the feature of the contour image 910.

At block 506, the method 500 generates the additional depth images based on the identified movement of the feature. The additional depth images may be inserted into the second sequence to effectively up-convert the second rate of the second sequence to correspond to the first rate of the first sequence. In some implementations, the upconverted second rate (e.g., depth image frame rate) is synchronized with the first rate (e.g., light intensity frame rate). For example, as previously discussed, the depth camera frame rate may be 30 FPS, and the light intensity frame rate may be 120 FPS. In other words, for every depth camera frame, there are four light intensity frames generated. Thus, the method 500 can determine three additional depth images per cycle and increase the effective depth camera frame rate to 120 FPS and synchronize the frame rates accordingly with the light intensity frame rate. Thus, the depth data is adjusted by determining additional depth images based on comparing an adjusted contour image of a current frame (e.g., at time $t_1$) with the contour image of the prior frame (e.g., at time $t_0$) to estimate a movement of a feature from one pixel to a neighbor pixel on the perimeter of an object. Adjusting the contour image is also known as evolving, altering, or modifying the contour image. Adjustments to the contour image may be processed for the first sequence of images until a new mask is obtained or received, such as when a new mask is received. The adjustment is based on information (e.g., a model) computed form the real scene RGB camera (e.g., mono/multi-dimensional color/texture models; e.g., histograms, gaussian mixture of models, etc.). In some implementations, the model can be computed also with data from other sensors (e.g., depth sensor) where this data is pixel-aligned with the data from the real scene RGB camera. The mask data may be used to generate two regions: inner and outer and, for each region, a model may be computed. The two models may be used to determine how to evolve/alter/modify the contour image.

Figure 6A:
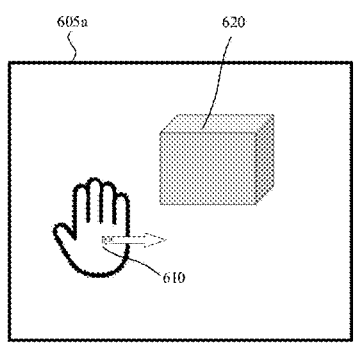
FIGS. 6A-6C are block diagrams illustrating an example occlusion event between a physical object and a virtual object in accordance with some implementations.
Figure 6B:
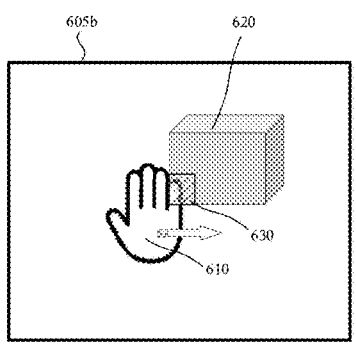
Figure 6C:
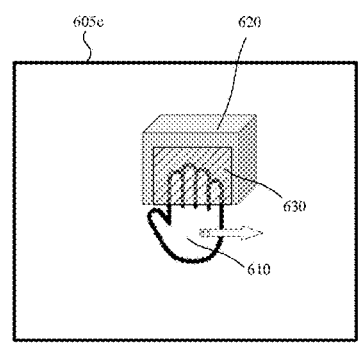

As will be illustrated in FIGS. 6A-6C, depictions of virtual objects (virtual object) can be combined with real objects of the physical environment from the images captured of the environment 105. In various implementations, using an accessible virtual object, such as a virtual cube 620, and selectable operator actions, the virtual cube 620 can be added to a CGR environment that includes real objects, such as the hand 610. In particular, FIG. 6A illustrates an image 605a of a CGR environment that includes a virtual cube 620 and the hand 610 without an occlusion occurring between the two objects (e.g., the hand 610 is not blocking the virtual cube 620 in this particular viewpoint). FIG. 6B illustrates an image 605b of a CGR environment that includes a virtual cube 620 and the hand 610 that has partially occluded a portion of the virtual cube 620 at the occlusion boundary region 630 as the hand has started waving in front of the virtual cube 620. FIG. 6C illustrates an image 605c of a CGR environment that includes a virtual cube 620 and the hand 610 that has occluded a larger portion of the virtual cube 620 at the occlusion boundary region 630 as the hand has continue waving in front of the virtual cube 620.

FIGS. 6B and 6C illustrate an occlusion boundary region 630 in a CGR environment that is used to determine additional depth images corresponding to depths of the physical environment with respect to the hand 610 and virtual cube 620 based on contour image of the occlusion boundary region 630 in accordance with some implementations described herein. In various implementations, an occlusion boundary region 630 is occlusion boundary between detected real objects (e.g., hand 610) and virtual objects (e.g., virtual cube 620) in the CGR environment. In some implementations, the occlusion boundary region 630 is based on where and how the detected real objects and the virtual objects overlap in the CGR environment. In some implementations, the occlusion boundary region 630 can be a preset or variable size or a preset or variable number of pixels (e.g., a few pixels or tens of pixels) based on the display device characteristics, size of the detected real objects and the virtual objects, motion of the detected real objects and the virtual objects or the like. In some implementations, the occlusion boundary region 630 is resolved before generating or displaying the CGR environment. In some implementations, the occlusion boundary region 630 is resolved on a frame-by-frame process. In some implementations, the occlusion boundary region 630 is resolved by an occlusion boundary region correction process. In some implementations, an algorithm processes criteria that precisely determines whether each pixel in the occlusion boundary region is to be corrected based on determining whether the pixel should be part of the virtual object or the detected real object and is occluded or visible. In some implementations, the occlusion boundary region is corrected at full image resolution. In some implementations, the occlusion boundary region is corrected at least in part using a reduced image resolution.

In some implementations, the occlusion boundary region 630 may be distorted or blurry with respect to the virtual cube 620 when the hand 610 is waving in front of the virtual cube 620 and is caused at least in part by a lower frame rate for the depth camera image sequence. For example, the light intensity camera image sequence (e.g., RGB camera) may be received at 120 fps, but the depth camera may only be acquiring depth images at 40 fps. Thus, the CGR environment may show some lag in the virtual object and physical objects during a quick movement of a physical object in front of a virtual object creating an occlusion event.

FIG. 7 is a block diagram illustrating an example occlusion contour image at an occlusion boundary region. For example, the occlusion grid 705 may be of the occlusion boundary region 630 of the image 605c in FIG. 6C where the hand 610 is partially occluding the virtual cube 620. FIG. 7 illustrates the generated contour image 710 representing the hand 610. According to the depth up-convert techniques described herein, each pixel and neighboring pixels are evaluated for the contour image 710. As shown, the pixel grid 705 will designate a "1" for each pixel that the contour image 710 is determined to overlap the particular pixel, or have some feature that is displayed at the particular pixel. For example, as discussed herein, the generated contour image is based on the mask data, identifying an interior edge and/or exterior edge of the portion of the physical environment or the portion of the virtual content. For the top of the ring finger for the contour image, pixel region 720 includes pixel 722 which is directly outside of the contour image 710, and thus would represent an exterior edge of the hand contour image 710. In some implementations, instead of a blank pixel being shown, a "0" could be used to designate the pixels that a feature (e.g., where the contour image did not overlap the pixel) was not identified.

Figure 8:
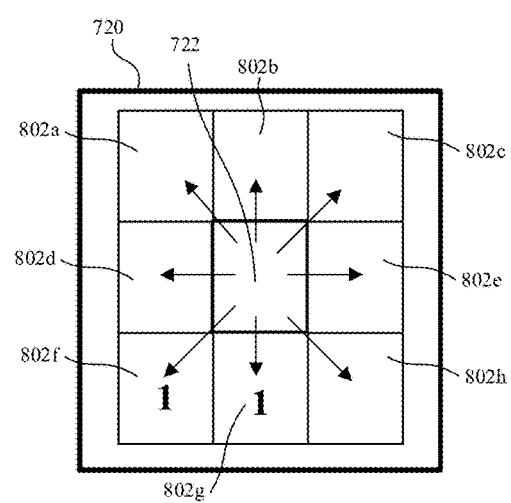
FIG. 8 is a block diagram illustrating example neighboring pixels corresponding to a pixel region of FIG. 7 according to certain implementations.

FIG. 8 is a block diagram illustrating example neighboring pixels 802a-802h of pixel 722 in the pixel region 720 of FIG. 7. As discussed herein, generated contour image identifies an interior edge and/or exterior edge of the portion of the physical environment or the portion of the virtual content. Each neighboring pixel (e.g., neighboring pixel 802a-802h) of a particular pixel (e.g., pixel 722) is analyzed when a feature is determined to be shown or not shown at a particular pixel location. For example, at a particular image frame, pixel 722 does not have a particular feature (e.g., the contour image 710 did not overlap pixel 722), and thus there is no designation of that feature in the grid. However, neighboring pixel 802f and neighboring pixel 802g were determined to include the feature and were designated with a "1". In a subsequent image frame, pixel 722 and neighboring pixels 802a-802h are then analyzed to determine if the subsequently-generated contour image for the subsequent image frame has features that moved within the occlusion grid 705. An example of analyzing a movement during an occlusion event from one light intensity frame to the next subsequent light intensity frame is shown and described in FIGS. 9-10.

Figure 9A:
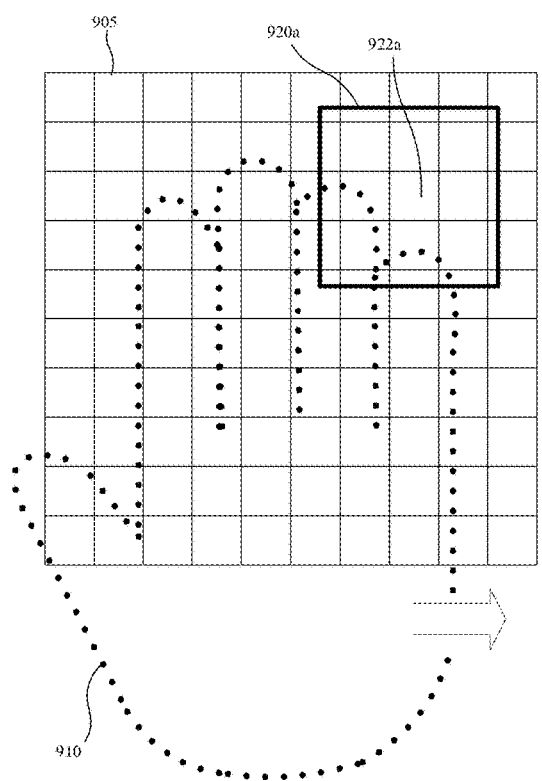
FIGS. 9A-9B are block diagrams illustrating example adjusting of a contour image at an occlusion boundary region according to certain implementations.
Figure 9B:
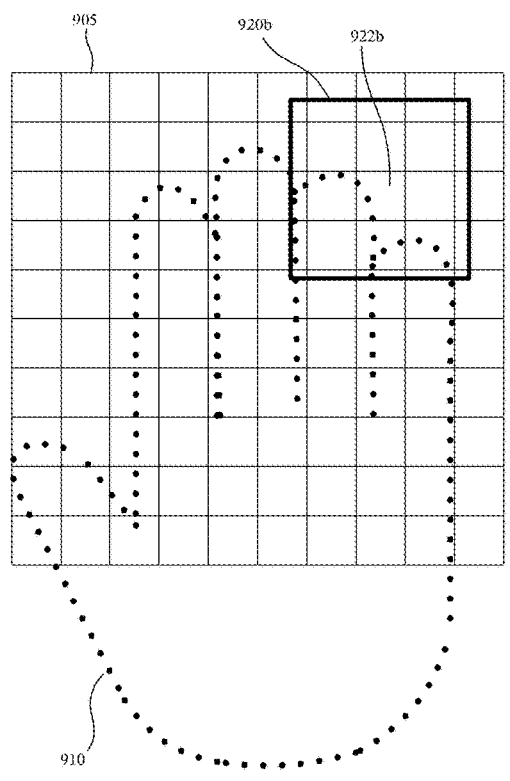

FIGS. 9A and 9B illustrate block diagrams of an example contour image at an occlusion boundary region. For example, the grid 905 may be of the occlusion boundary region 630 of the image 605c in FIG. 6C where the hand 610 is partially occluding the virtual cube 620. FIG. 9A illustrates the generated contour image 910 representing the hand 610 that is moving to the right at a particular first frame (e.g., frame $X_0$ at time $t_0$). FIG. 9B illustrates the contour image 910 in a subsequent light intensity image frame (e.g., frame $X_1$ at time $t_1$) after it has moved to the right. In the exemplary embodiment, the contour image 910 in FIG. 9B is adjusted/evolved/altered/modified from the contour image 910 in FIG. 9A. Alternatively, the contour image 910 in FIG. 9B is a newly generated contour image. Each pixel and neighboring pixels may be evaluated for the contour image 910. The pixel 922a in the pixel region 920a in FIG. 9A, and the pixel 922b in the pixel region 920b in FIG. 9B, are shown in more detail in FIGS. 10A and 10B, respectively.

FIGS. 10A and 10B illustrate block diagrams of pixel grids of an example occlusion contour image in at an occlusion boundary region at a particular image frame and a subsequent image frame. In particular, FIG. 10A illustrates the generated contour image 910 within the pixel region 920a of FIG. 9A at a particular first frame (e.g., frame $X_0$ at time $t_0$), including the pixel 922a, and neighboring pixels 1002a-1002h. Similarly, FIG. 10B illustrates the generated contour image 910 within the pixel region 920*b* of FIG. 9B at a subsequent light intensity image frame (e.g., frame $X_1$ at time $t_1$) after the hand has moved to the right, including the pixel 922*b* and neighboring pixels 1004*a*-1004*h* (which correspond to the same pixel locations as pixel 922*a* and neighboring pixels 1002*a*-1002*h* of FIG. 9A). FIG. 10A illustrates the generated contour image 910 such that the pixel 922*a* does not include a feature of the contour image, but neighboring pixels 1002*d*, 1002*f*, 1002*g*, and 1002*h* would be marked as having a feature and may be marked by the system with "1" for positively including the feature of the contour image 910. In a subsequent image frame, FIG. 10B illustrates the generated contour image 910 has moved to the right (either adjusted from FIG. 10A, or a new one is generated), such that the pixel 922*b* (corresponding to the pixel 922*a* having the same pixel location) and neighboring pixels 1004*d*, 1004*g*, and 1004*h* would be marked as having a feature and may be marked by the system with "1" for positively including the feature of the contour image 910. Thus, as the hand 610 moved to the right in the image in front of the virtual cube 620 in FIG. 6, a portion of the generated contour image 910 is detected as moving from one pixel location to a subsequent pixel location. This data is then used to update the depth rate images as described herein.

The examples of FIGS. 6-10 illustrate various implementations of occlusion handling in CGR environments for a moving real object as it occludes a virtual object. The efficient and accurate determination of occlusion using techniques disclosed herein can enable or enhance CGR environments by updating or dragging the slower depth rate image sequences. FIGS. 11-14 illustrate an example block diagrams for data flow of updating or dragging the slower depth rate image sequences for a subsequent light intensity frame.

Figure 11:
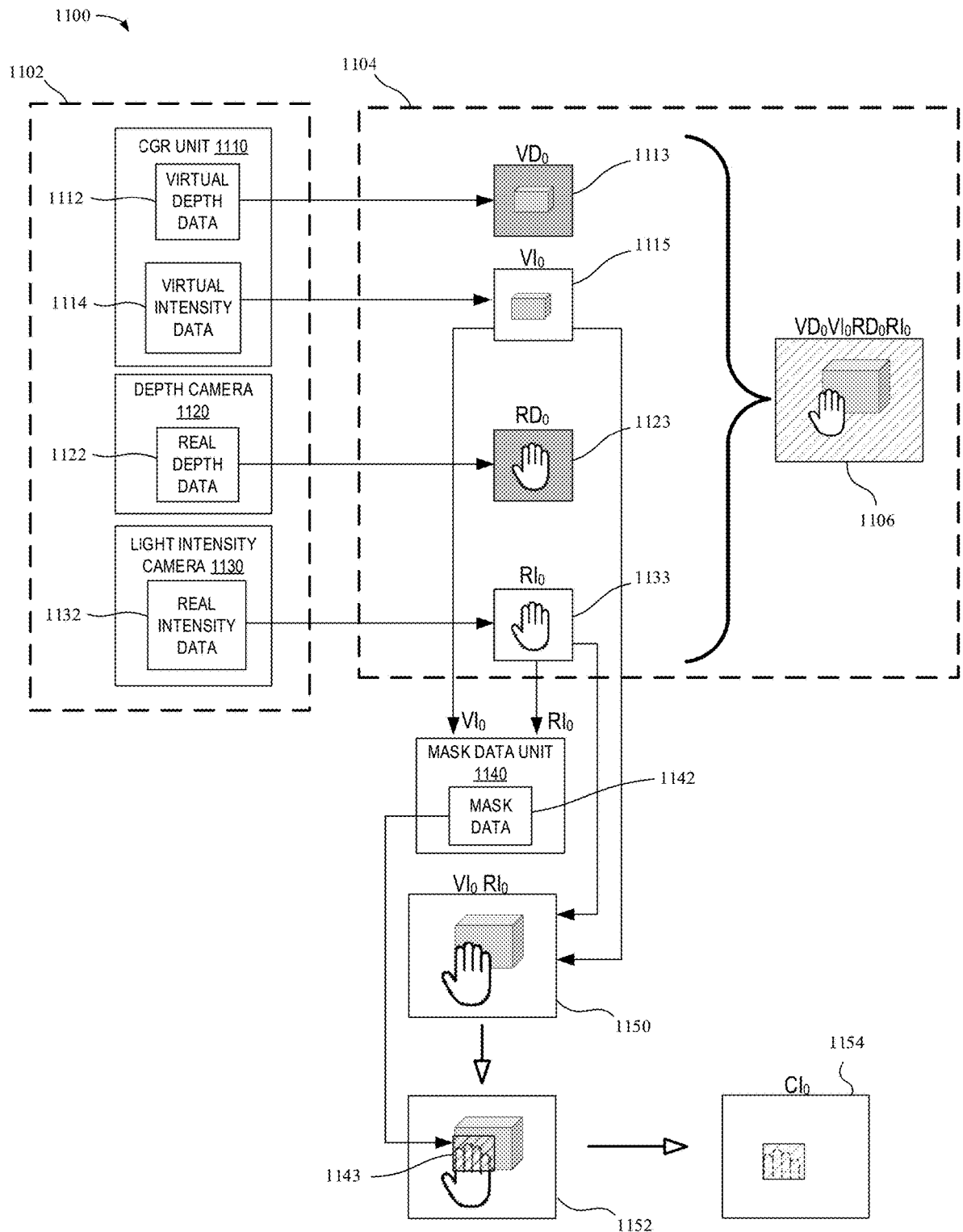
FIG. 11 is a system flow diagram of an example generation of an occlusion contour image at an occlusion boundary region according to certain implementations.

FIG. 11 is a system flow diagram of an example environment 1100 in which a system can generate an occlusion contour image at an occlusion boundary region based on received image data (e.g., physical content and virtual content) from a composition pipeline at an initial time (e.g., time $t_0$). In some implementations, the system flow of the example environment 1100 is performed on a device (e.g., controller 110 of FIGS. 1 and 2), such as a mobile device, desktop, laptop, or server device. The system flow of the example environment 1100 can be performed on a device (e.g., device 120 of FIGS. 1 and 3) that has a screen for displaying 2D images and/or a screen for viewing stereoscopic images such as a head-mounted display (HMD). In some implementations, the system flow of the example environment 1100 is performed on processing logic, including hardware, firmware, software, or a combination thereof. In some implementations, the system flow of the example environment 1100 is performed on a processor executing code stored in a non-transitory computer-readable medium (e.g., a memory).

The example environment 1100 includes a composition pipeline 1102 that acquires or obtains data (e.g., image data) for a physical environment (e.g., physical environment 105 of FIG. 1) and virtual content (e.g., virtual cube 620 of FIG. 6) that is generated for a CGR environment as described herein. The composition pipeline 1102 includes a CGR unit 1110 (e.g., CGR unit 248 of FIG. 2, and CGR unit 348 of FIG. 3) that is configured with instructions executable by a processor to provide a CGR environment that includes depictions of a physical environment including real objects and virtual content. The CGR unit 1110 generates virtual depth data 1112 and virtual intensity data 1114. The virtual depth data 1112 includes the depth images of virtual content, such as a virtual object (e.g., virtual cube 620 of FIG. 6), and the virtual intensity data 1114 includes the light intensity images (e.g., RGB) of the virtual content. The composition pipeline 1102 further includes a depth camera 1120 that acquires real depth data 1122 of the physical environment, and a light intensity camera 1130 (e.g., RGB camera) that acquires real intensity data 1132. The composition pipeline 1102 sends the acquired data (e.g., virtual depth data 1112, virtual intensity data 1114, real depth data 1122, and real intensity data 1132) to a CGR composition display area 1104. Example environment 1100 is an example of acquiring the composition pipeline data at an initial time $t_0$. Thus, the CGR composition display area 1104 receives: (i) an initial virtual depth image frame $VD_0$ 1113 from the CGR unit 1110, (ii) an initial virtual intensity image frame $VI_0$ 1115 from the CGR unit 1110, (iii) an initial real depth image frame $RD_0$ 1123 from the depth camera 1120, and (iv) an initial real light intensity image $RI_0$ 1133 from the light intensity camera 1130. The CGR composition display area 1104 then provides the composite image $VD_0VI_0RD_0RI_0$ 1106 to a display on a device, such as display 312 on device 120 in FIG. 3.

In some implementations, at the initial time $t_0$, the mask data unit 1140 (e.g., mask data unit 242 of FIG. 2, and mask data unit 342 of FIG. 3) obtains or receives the initial virtual intensity image frame $VI_0$ 1115 and the initial real light intensity image $RI_0$ 1133 and generates mask data 1142 (e.g., an occlusion mask). Additionally, at the initial time $t_0$, the system obtains or receives the initial virtual intensity image frame $VI_0$ 1115 and the initial real light intensity image $RI_0$ 1133 to generate the initial intensity image frame $VI_0RI_0$ 1150. The system, at the initial time $t_0$, obtains and combines the mask data 1142 with the initial intensity image frame $VI_0RI_0$ 1150 to generate the initial masked image frame 1152 (e.g., the hand 610 initially waving in front of the virtual cube 620 as shown in FIG. 6B) that includes an occlusion boundary region 1143 (e.g., the occlusion boundary region 630 as shown in FIG. 6). The system then generates an initial contour image $CI_0$ 1154 (e.g., the contour image 710 of FIG. 7) based on the occlusion in the occlusion boundary region 1143 at the initial time $t_0$. For example, at the initial time $t_0$, a physical/real object (e.g., a hand) is occluding a virtual object (e.g., a virtual cube), the system would generate a contour image of the physical object that is occluding the virtual object.

Figure 12:
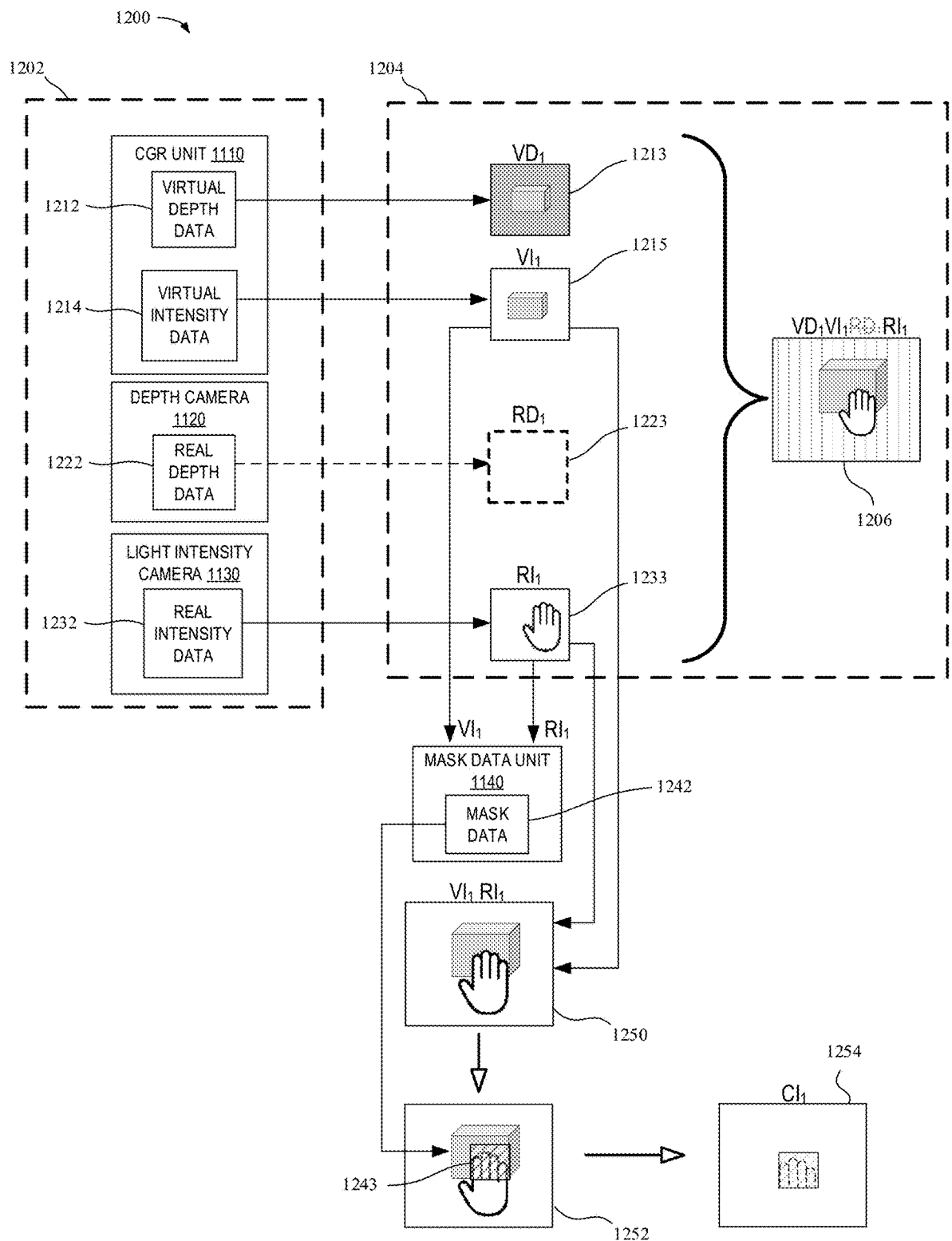
FIG. 12 is a system flow diagram of an example generation of an occlusion contour image at an occlusion boundary region according to certain implementations.

FIG. 12 is a system flow diagram of an example environment 1200 in which a system can adjust an occlusion contour image at an occlusion boundary region based on received image data (e.g., physical content and virtual content) from a composition pipeline at a subsequent time (e.g., time $t_1$) with respect to the initial time (e.g., time $t_0$) of FIG. 11. Alternatively, the system can generate another occlusion contour image at an occlusion boundary region based on updated image data. In some implementations, the system flow of the example environment 1200 is performed on a device (e.g., controller 110 of FIGS. 1 and 2), such as a mobile device, desktop, laptop, or server device. The system flow of the example environment 1200 is performed can be performed on a device (e.g., device 120 of FIGS. 1 and 3) that has a screen for displaying 2D images and/or a screen for viewing stereoscopic images such as a head-mounted display (HMD). In some implementations, the system flow of the example environment 1200 is performed on processing logic, including hardware, firmware, software, or a combination thereof. In some implementations, the system flow of the example environment 1200 is performed on a processor executing code stored in a non-transitory computer-readable medium (e.g., a memory).

The example environment 1200 acquires data at a subsequent time $t_1$, where the frame rates for the virtual content data (e.g., virtual depth data and virtual intensity data) matches the light intensity camera frame rates, such as 120 FPS, for example. However, because a depth camera is typically slower at acquiring the respective depth image data, such as 40 FPS, the system would acquire two additional frames of data for the virtual content and real intensity data for each frame of the real depth data. Therefore, for the example environment 1200, subsequent time $t_1$ represents a subsequent image data frame from the light intensity camera frame rate where the real depth data is not available.

The example environment 1200 includes a composition pipeline 1202 that acquires or obtains data (e.g., image data) for a physical environment (e.g., physical environment 105 of FIG. 1) and virtual content (e.g., virtual cube 620 of FIG. 6) that is generated for a CGR environment as described herein. The composition pipeline 1202 includes a CGR unit 1110 (e.g., CGR unit 248 of FIG. 2, and CGR unit 348 of FIG. 3) that is configured with instructions executable by a processor to provide a CGR environment that includes depictions of a physical environment including real objects and virtual content. The CGR unit 1110 generates virtual depth data 1212 and virtual intensity data 1214. The virtual depth data 1212 includes the depth images of virtual content, such as a virtual object (e.g., virtual cube 620 of FIG. 6), and the virtual intensity data 1214 includes the light intensity images (e.g., RGB) of the virtual content. The composition pipeline 1202 further includes a depth camera 1120 that acquires real depth data 1222 of the physical environment, and a light intensity camera 1130 (e.g., RGB camera) that acquires real intensity data 1232. The composition pipeline 1202 sends the acquired data (e.g., virtual depth data 1212, virtual intensity data 1214, real depth data 1222, and real intensity data 1232) to a CGR composition display area 1204. Example environment 1200 is an example of acquiring the composition pipeline data at a subsequent time $t_1$ with respect to the initial time $t_0$ in the example environment 1100 at a particular frame with respect to the real intensity data where the real depth data is not available. Thus, the CGR composition display area 1204 receives: (i) a subsequent virtual depth image frame $VD_1$ 1213 from the CGR unit 1110, (ii) a subsequent virtual intensity image frame $VI_0$ 1215 from the CGR unit 1110, and (iii) a subsequent real light intensity image $RI_1$ 1233 from the light intensity camera 1130, but does not receive a subsequent real depth image frame $RD_1$ 1223 from the depth camera 1120. The CGR composition display area 1204 then provides the composite image $VD_1VI_1RI_1$ 1206 to a display on a device, such as display 312 on device 120 in FIG. 3.

In some implementations, at the initial time $t_1$, the mask data unit 1140 (e.g., mask data unit 242 of FIG. 2, and mask data unit 342 of FIG. 3) obtains or receives the initial virtual intensity image frame $VI_1$ 1215 and the initial real light intensity image Rh 1233 and generates mask data 1242 (e.g., an occlusion mask). Additionally, at the subsequent time $t_1$, the system obtains or receives the subsequent virtual intensity image frame $VI_1$ 1215 and the subsequent real light intensity image Rh 1233 to generate the subsequent intensity image frame $VI_1RI_1$ 1250. The system, at the subsequent time obtains and combines the mask data 1242 with the initial intensity image frame 1250 to generate the initial masked image frame 1252 (e.g., the hand 610 waving in front of and closer to the opposite side of the virtual cube 620 as shown in FIG. 6C) that includes an occlusion boundary region 1243 (e.g., the occlusion boundary region 630 as shown in FIG. 6).

In some implementations, the system then adjusts the contour image $CI_1$ 1254 (e.g., adjusts/evolves/modifies the contour image 1154 of FIG. 11) based on the occlusion in the occlusion boundary region 1243 at the subsequent time $t_1$. For example, at the subsequent time $t_1$, a physical/real object (e.g., a hand) is occluding a virtual object (e.g., a virtual cube), the system would adjust a previous contour image of the physical object that is occluding the virtual object from a prior image frame. Alternatively, the system generates the subsequent contour image $CI_1$ 1254 (e.g., the contour image 910 of FIG. 9B) based on the occlusion in the occlusion boundary region 1243 at the subsequent time $t_1$. For example, at the subsequent time $t_1$, a physical/real object (e.g., a hand) is occluding a virtual object (e.g., a virtual cube), the system would generate an additional contour image of the physical object that is occluding the virtual object.

FIG. 13 is a system flow diagram of an example environment 1300 in which a system can determine additional depth images based on the adjusting of a contour image (e.g., initial contour image $CI_0$ 1154 of FIG. 11 and subsequent contour image $CI_1$ 1254 of FIG. 12). In some implementations, the system flow of the example environment 1300 is performed on a device (e.g., controller 110 of FIGS. 1 and 2), such as a mobile device, desktop, laptop, or server device. The system flow of the example environment 1300 is performed can be performed on a device (e.g., device 120 of FIGS. 1 and 3) that has a screen for displaying 2D images and/or a screen for viewing stereoscopic images such as a head-mounted display (HMD). In some implementations, the system flow of the example environment 1300 is performed on processing logic, including hardware, firmware, software, or a combination thereof. In some implementations, the system flow of the example environment 1300 is performed on a processor executing code stored in a non-transitory computer-readable medium (e.g., a memory).

The example environment 1300 compares contour image data between a prior time frame (e.g., initial contour image $CI_0$ 1154 of FIG. 11 at initial time $t_0$) and a current time frame (e.g., adjusted/evolved/altered/modified subsequent contour image $CI_1$ 1254 of FIG. 12 at subsequent time $t_1$) in order to generate the missing real depth data at subsequent time $t_1$ because of the mismatched frame rate speeds. Recall, for example, the frame rates for the virtual content data (e.g., virtual depth data and virtual intensity data) matches the light intensity camera frame rates, such as 120 FPS, for example. However, because a depth camera is typically slower at acquiring the respective depth image data, such as 40 FPS, the system would acquire two additional frames of data for the virtual content and real intensity data for each frame of the real depth data. Therefore, for the example environments 1200 and 1300, subsequent time $t_1$ represents a subsequent image data frame from the light intensity camera frame rate where the real depth data is not available.

The example environment 1300 includes a depth rate up-conversion unit 1310 (e.g., depth rate up-conversion unit 246 of FIG. 2, and/or depth rate up-conversion unit 346 of FIG. 3) that is configured with instructions executable by a processor to perform depth rate up-conversion handling (e.g., by "dragging" depths from their positions in the prior depth frame to new positions for a new frame) for a CGR environment using one or more of the techniques disclosed herein. For example, as described above with respect to FIGS. 9A-9B and 10A-10B, the depth rate up-conversion unit 1310 evaluates features of each pixel and neighboring pixels for contour images (e.g., initial contour image $CI_0$ and the adjusted subsequent contour image $CI_1$). Thus, as FIG. 10B illustrates, an adjusted contour image 910 (e.g., subsequent contour image $CI_1$) has moved to the right, such that the pixel 922b (corresponding to the pixel 922a having the same pixel location) and neighboring pixels 1004d, 1004g, and 1004h would be marked as having a feature and may be marked by the system with "1" for positively including the feature of the contour image 910. Thus, as the hand 610 moved to the right in the image in front of the virtual cube 620 in FIG. 6, a portion of the contour image 910 is detected as moving from one pixel location to a subsequent pixel location. This depth data is then used to update the depth rate images so that the composite image $VD_1VI_1RI_1$ 1206 at subsequent time $t_1$ would now include a generated subsequent real depth image frame $RD_1$ 1323 to produce a new composite image $VD_1VI_1RD_1RI_1$ at subsequent time $t_1$.

FIG. 14 is a system flow diagram of an example environment 1400 in which a system can determine additional depth images based on two generated contour images (e.g., initial contour image $CI_0$ 1154 of FIG. 11 and subsequent contour image $CI_1$ 1254 of FIG. 12). In some implementations, the system flow of the example environment 1400 is performed on a device (e.g., controller 110 of FIGS. 1 and 2), such as a mobile device, desktop, laptop, or server device. The system flow of the example environment 1400 is performed can be performed on a device (e.g., device 120 of FIGS. 1 and 3) that has a screen for displaying 2D images and/or a screen for viewing stereoscopic images such as a head-mounted display (HMD). In some implementations, the system flow of the example environment 1400 is performed on processing logic, including hardware, firmware, software, or a combination thereof. In some implementations, the system flow of the example environment 1400 is performed on a processor executing code stored in a non-transitory computer-readable medium (e.g., a memory).

The example environment 1400 compares contour image data between a prior time frame (e.g., initial contour image $CI_0$ 1154 of FIG. 11 at initial time $t_0$) and a current time frame (e.g., subsequent contour image $CI_1$ 1254 of FIG. 12 at subsequent time $t_1$) in order to generate the missing real depth data at subsequent time $t_1$ because of the mismatched frame rate speeds. Recall, for example, the frame rates for the virtual content data (e.g., virtual depth data and virtual intensity data) matches the light intensity camera frame rates, such as 120 FPS, for example. However, because a depth camera is typically slower at acquiring the respective depth image data, such as 40 FPS, the system would acquire two additional frames of data for the virtual content and real intensity data for each frame of the real depth data. Therefore, for the example environments 1200 and 1400, subsequent time $t_1$ represents a subsequent image data frame from the light intensity camera frame rate where the real depth data is not available.

The example environment 1400 includes a depth rate up-conversion unit 1410 (e.g., depth rate up-conversion unit 246 of FIG. 2, and/or depth rate up-conversion unit 346 of FIG. 3) that is configured with instructions executable by a processor to perform depth rate up-conversion handling (e.g., by "dragging" depths from their positions in the prior depth frame to new positions for a new frame) for a CGR environment using one or more of the techniques disclosed herein. For example, as described above with respect to FIGS. 9A-9B and 10A-10B, the depth rate up-conversion unit 1410 evaluates features of each pixel and neighboring pixels for the generated contour images (e.g., initial contour image $CI_0$ and subsequent contour image $CI_1$). Thus, as FIG. 10B illustrates, the generated contour image 910 (e.g., subsequent contour image $CI_1$) has moved to the right, such that the pixel 922b (corresponding to the pixel 922a having the same pixel location) and neighboring pixels 1004d, 1004g, and 1004h would be marked as having a feature and may be marked by the system with "1" for positively including the feature of the contour image 910. Thus, as the hand 610 moved to the right in the image in front of the virtual cube 620 in FIG. 6, a portion of the generated contour image 910 is detected as moving from one pixel location to a subsequent pixel location. This depth data is then used to update the depth rate images so that the composite image $VD_1VI_1RI_1$ 1206 at subsequent time $t_1$ would now include a generated subsequent real depth image frame $RD_1$ 1423 to produce a new composite image $VD_1VI_1RD_1RI_1$ at subsequent time $t_1$.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
    at an electronic device having a processor:
    receiving a first sequence of images corresponding to light intensities of a physical environment and a second sequence of images corresponding to depths of the physical environment, wherein the first sequence has a first rate and the second sequence has a second rate that differs from the first rate;
    generating a contour image for a first frame of the first sequence of images;
    adjusting the contour image based on a second frame of the first sequence of images; and
    determining additional depth images corresponding to depths of the physical environment based on the adjusting of the contour image.

2. The method of claim 1, wherein generating the contour image is based on mask data.

3. The method of claim 2, wherein the mask data distinguishes a portion of the physical environment from a portion of virtual content.

4. The method of claim 3, wherein the contour image identifies an interior edge or an exterior edge of the portion of the physical environment.

5. The method of claim 3, wherein the contour image identifies an interior edge or an exterior edge of the portion of the virtual content.

6. The method of claim 1, further comprising adjusting the second sequence of images based at least on the additional depth images.

7. The method of claim 1, further comprising upconverting the second rate of the second sequence of images by inserting the additional depth images into the second sequence of images, wherein the upconverted second rate is synchronized with the first rate.

8. The method of claim 1, further comprising:
    adjusting the second sequence of images based at least on the additional depth images;
    receiving a third sequence of images corresponding to depths of virtual content; and
    determining occlusion between the physical environment and the virtual content based on the adjusted second sequence of images and the third sequence of images.

9. The method of claim 8, wherein determining the occlusion comprises comparing depths of the physical environment in the adjusted second sequence of images with depths of the virtual content in the third sequence of images.

10. The method of claim 1, further comprising receiving a third sequence of images corresponding to light intensities of virtual content and a fourth sequence of images corresponding to depths of the virtual content.

11. The method of claim 10, wherein generating the contour image is based on an occlusion mask that identifies an area of the virtual content depicted in an image of the third sequence of images that is occluded by an area of the physical environment depicted in a corresponding image of the first sequence of images.

12. The method of claim 11, wherein generating a contour image comprises identifying an inside outline inside the area of the virtual content that is occluded by the area of the physical environment in the occlusion mask.

13. The method of claim 11, wherein generating a contour image comprises identifying an outside outline outside the area of the virtual content that is occluded by the area of the physical environment in the occlusion mask.

14. The method of claim 1, wherein:
    the contour image for the first frame of the first sequence of images comprises a first contour image;
    adjusting the contour image based on the second frame of the first sequence of images comprises a second contour image;
    the second frame of the first sequence of images subsequently follows the first frame; and
    determining the additional depth images comprises:
        comparing a plurality of pixels of the first contour image of the first frame with a plurality of pixels of the contour image of the second frame for the first sequence of images, wherein the plurality of pixels of the first contour image are spatially correlated and are aligned with the plurality of pixels of the second contour image;
        identifying a movement of a feature of the physical environment from a first pixel in the first contour image to an associated second pixel in the second contour image; and generating, based on the identified movement of the feature, the additional depth images.

15. The method of claim 1, wherein pixels of the images of the first sequence are spatially correlated and aligned with pixels of images of the second sequence.

16. The method of claim 1, wherein the first frame of the first sequence of images is synchronized with a first frame of the second sequence of images.

17. The method of claim 1, further comprising providing a computer-generated reality (CGR) environment that includes the virtual content and the physical environment.

18. The method of claim 17, wherein the CGR environment is provided on a head-mounted device (HMD).

19. A device comprising:
  a non-transitory computer-readable storage medium; and
  one or more processors coupled to the non-transitory computer-readable storage medium, wherein the non-transitory computer-readable storage medium comprises program instructions that, when executed on the one or more processors, cause the one or more processors to perform operations comprising:
    receiving a first sequence of images corresponding to light intensities of a physical environment and a second sequence of images corresponding to depths of the physical environment, wherein the first sequence has a first rate and the second sequence has a second rate that differs from the first rate;
    generating a contour image for a first frame of the first sequence of images;
    adjusting the contour image based on a second frame of the first sequence of images; and
    determining additional depth images corresponding to depths of the physical environment based on the adjusting of the contour image.

20. A non-transitory computer-readable storage medium, storing program instructions computer-executable on a computer to perform operations comprising:
  receiving a first sequence of images corresponding to light intensities of a physical environment and a second sequence of images corresponding to depths of the physical environment, wherein the first sequence has a first rate and the second sequence has a second rate that differs from the first rate;
  generating a contour image for a first frame of the first sequence of images;
  adjusting the contour image based on a second frame of the first sequence of images; and
  determining additional depth images corresponding to depths of the physical environment based on the adjusting of the contour image.

* * * * *